May 5, 1942.　　　　　H. H. ASBRIDGE　　　　　2,281,817
WORK GAUGING INSTRUMENT FOR PRECISION GRINDING MACHINES
Filed March 31, 1941　　　2 Sheets-Sheet 1

Inventor
H. H. Asbridge
By: Glascock Downing & Seebold
Attys.

May 5, 1942. H. H. ASBRIDGE 2,281,817
WORK GAUGING INSTRUMENT FOR PRECISION GRINDING MACHINES
Filed March 31, 1941 2 Sheets-Sheet 2

Inventor,
H. H. Asbridge
By: Glascock Downing & Seebold
Attys.

Patented May 5, 1942

2,281,817

UNITED STATES PATENT OFFICE 2,281,817

WORK GAUGING INSTRUMENT FOR PRECISION GRINDING MACHINES

Harry Hales Asbridge, Ashton-on-Mersey, England, assignor to The Churchill Machine Tool Company Limited, Broadheath, near Altrincham, England, a British company Application March 31, 1941, Serial No. 386,154
In Great Britain March 21, 1940

2 Claims. (Cl. 51—165)

Work gauging instruments for gauging work whilst grinding is proceeding usually comprise a single contact point or finger spring loaded to keep in engagement with the work as the latter is reduced in size by the grinding wheel. Such an instrument actually measures a radius of the work from the axis of the work centres and not its actual diameter. If there are variations in centre height of the grinding machine due to temperature variations or other causes, the gauging becomes inaccurate and therefore the finished work is inaccurate. The reading given by the instrument may be upon a dial type indicator, or electric contacts may control the grinding machine to withdraw the grinding wheel when a correct size is reached.

The object of this invention is to provide an improved gauging instrument which is reliable and accurate and readily used.

My invention consists in a gauging instrument comprising the combination of parts hereafter described and claimed.

Referring to the accompanying explanatory drawings.

The improved gauging instrument comprises a frame $a$ carried by a trunnion $b$ in a swinging link $c$ pivotally secured to a base $d$, which is clamped to the bracket $e$ upon the grinding machine bed.

The frame $a$ has one finger or contact piece $f$ adjustably mounted therein and the other finger or contact piece $g$ is mounted in the end of a lever $h$ pivoted at $i$ in the frame $a$ and carrying the insulated electric contact $j$ which when the workpiece has been reduced to the requisite extent by grinding engages with the contact $k$ connected to the frame $a$.

A screw $m$ fixed in the base $d$ serves as a stop to limit the movement of the swinging link $c$ under the weight of the frame $a$ and so ensures that the contacts are always in a vertical plane containing the axis of the workpiece $n$. $o$ indicates the grinding wheel.

The lever $h$ can operate a dial type indicator $p$.

Figure 1:
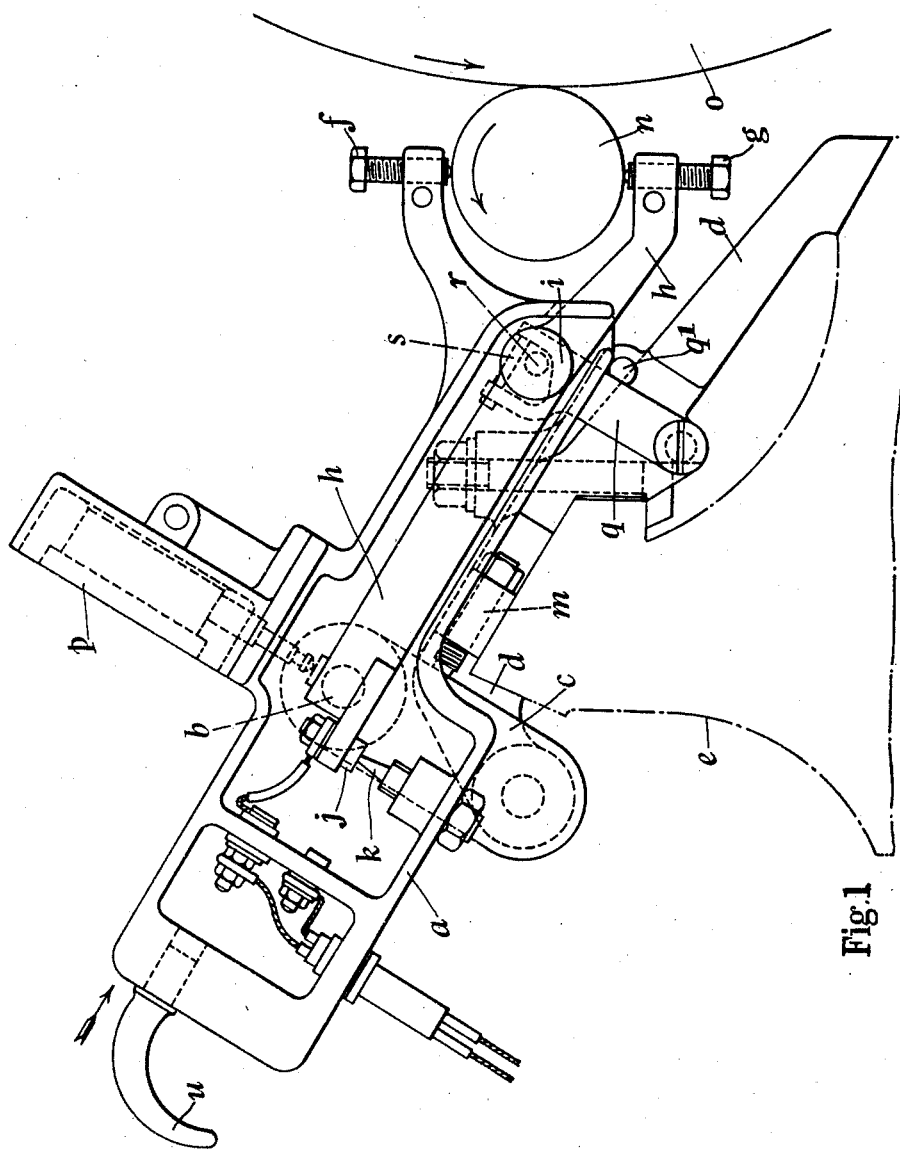
Figure 1 is an elevation showing one form of my improved gauging instrument in position gauging a workpiece being ground.
Figure 3:
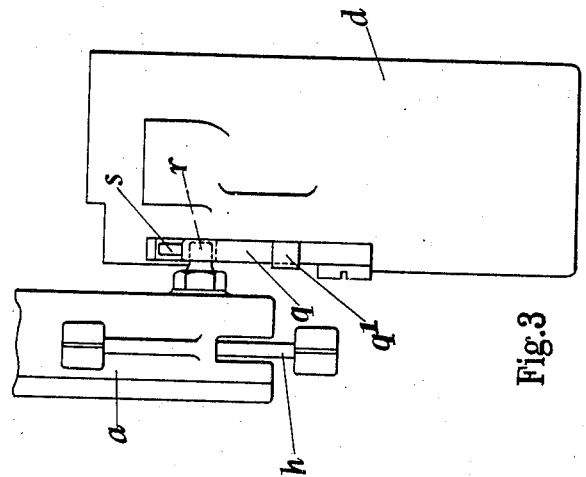
Figure 3 is an end view of part of the gauging instrument looking from right to left in Figure 1.
Figure 2:
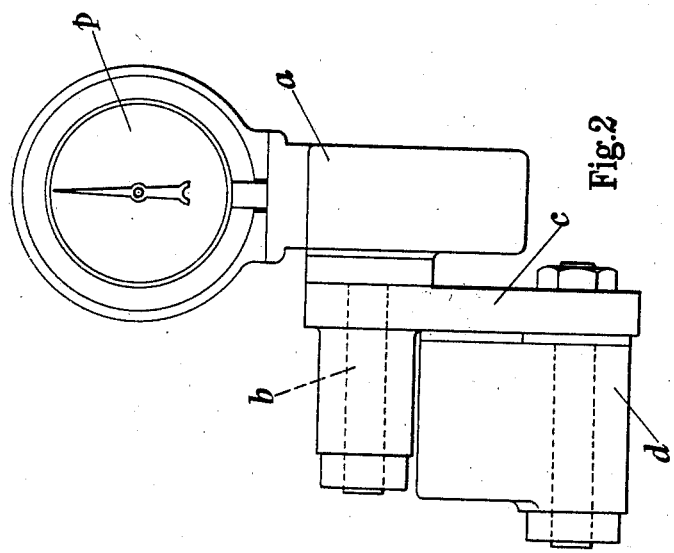
Figure 2 is an end view looking in the direction of the arrow in Figure 1.

To ensure that the contacts $f$ and $g$ are in approximately the correct horizontal positions to gauge the workpiece, I provide a lever $q$ pivoted in the base $d$ which has a bifurcated upper end to receive a pin $r$ upon the side of the frame $a$ (see Figure 3). The bifurcation may be closed by a pin $s$. The bottom of the bifurcation in the lever $q$ is shaped to cause the frame $a$ as it is pushed forward to the gauging position to keep the contacts $f$ and $g$ in the correct horizontal positions to pass over the workpiece. A stop $q^1$ limits the forward movement of the lever $q$.

In setting up the gauge, a piece of work of correct size is inserted between the machine centres and the frame $a$ pushed forward by use for example of the handle $u$ until the link $c$ is against the stop $m$. The top measuring contact $f$ is now adjusted to raise the pin $r$ sufficiently off the bottom of the bifurcated end of the lever $q$ to allow of the requisite reduction in the diameter of the work. The lower measuring contact $g$ is now appropriately adjusted to give the requisite distance between the two contacts when the electric contact $j$ is resting on $k$. When the work is finished to size, the said contacts $j$ and $k$ will engage and appropriate means will cause the withdrawal of the grinding wheel. At the same time the dial gauge $p$ will give a zero reading.

The gauging instrument is withdrawn from the workpiece by pulling on the handle $u$ which causes the frame to swing with and about the link $c$.

What I claim is:

1. A work gauging instrument for precision grinding machines comprising, in combination, a base to be secured upon the grinding machine, a swinging frame, a work gauging contact secured in a bracket upon said frame, a lever pivoted in said frame, a work gauging contact secured in the lower end of said lever below the aforesaid work gauging contact, the weight of the lever tending to raise the gauging contact thereon, an indicating instrument upon said frame actuated by said lever, a link pivoted at its lower end to said base and at its upper end to said frame, a stop upon said base limiting the pivotal movement of said link towards the work, a second link pivoted at its lower end to said base and bifurcated at its upper end, the said links permitting the swinging movements of the frame towards and away from the work, a pin upon said frame entering said bifurcation and capable of riding upon the shaped bottom thereof when the work gauging contacts are being moved on to and away from the work, and a stop for limiting the movement of said bifurcated link towards the work.

2. In a work gauging instrument as claimed in claim 1, an electrical contact upon the lever carrying the work gauging contact and a cooperating electrical contact upon the frame.

HARRY HALES ASBRIDGE.